United States Patent [19]

Rogers

[11] Patent Number: 5,548,620
[45] Date of Patent: Aug. 20, 1996

[54] ZERO LATENCY SYNCHRONIZED METHOD AND APPARATUS FOR SYSTEM HAVING AT LEAST TWO CLOCK DOMAINS

[75] Inventor: Alan C. Rogers, Palo Alto, Calif.

[73] Assignee: Sun Microsystems, Inc., Mountain View, Calif.

[21] Appl. No.: 230,489

[22] Filed: Apr. 20, 1994

[51] Int. Cl.⁶ .................................................... H04L 7/00
[52] U.S. Cl. ........................ 375/354; 375/214; 375/220; 375/371; 375/376; 327/145; 327/151; 327/160; 327/161
[58] Field of Search ................................ 375/211, 214, 375/215, 220, 355, 356, 372, 371, 354, 376; 370/100.1, 103; 327/141, 144, 145, 152, 153, 161, 151, 160

[56] References Cited

U.S. PATENT DOCUMENTS

| | | | |
|---|---|---|---|
| 5,142,556 | 2/1992 | Ito | 375/354 |
| 5,256,912 | 10/1993 | Rios | 307/269 |
| 5,369,672 | 11/1994 | Matsumoto | 375/354 |
| 5,422,914 | 6/1995 | Snyder | 375/354 |

*Primary Examiner*—Stephen Chin
*Assistant Examiner*—Amanda T. Le

*Attorney, Agent, or Firm*—Blakely, Sokoloff, Taylor & Zafman

[57] ABSTRACT

A method and apparatus for implementing a zero latency synchronizer that permits the reliable transfer of data between clock domains by placing a metastability delay in the clock path. The zero latency synchronizer for synchronizing a signal from a first clock domain to a second clock domain is formed from a clock regenerator circuit and input and output master slave flip flops. The clock regenerator receives a first clock from the first clock domain and a second clock from the second clock domain and generates first and second regenerated clock signals. The first and second regenerated clock signals are formed in a manner that guarantees that the first and second regenerated clocks, in conjunction with the first and second clocks, can be used to control the input and output master slave flip flops and thereby pass data reliably from one clock domain to the other without delay. The master and the slave of the input flip flop are controlled respectively by the first clock domain clock and by the first regenerated clock. In turn, the master and slave of the output flip flop are respectively controlled by the second regenerated clock and by the second clock domain clock. A signal to be transferred from the first clock domain to the second clock domain is input to the master of the input flip flop. The output from the slave of the input flip flop is provided as input to the master of the output flip flop.

18 Claims, 6 Drawing Sheets

ZERO LATENCY SYNCHRONIZED METHOD AND APPARATUS FOR SYSTEM HAVING AT LEAST TWO CLOCK DOMAINS

BACKGROUND OF THE INVENTION

1. Field of the Invention

This invention relates to the general field of computers and digital design, and more particularly, to an apparatus and method for synchronizing signals traveling between clock domains in a digital system.

2. Art Background

A digital system frequently employs a plurality of digital subsystems. When these digital subsystems operate in conjunction with the same clock in synchronous fashion, synchronization of signals traveling between these digital subsystems is not necessary. If, however, these digital subsystems operate in conjunction with different clocks, signals traveling between these digital subsystems must be synchronized. For example, a computer system may operate at one frequency but the processor may operate at another frequency.

The asynchronous interface circuit that permits the transferring of data from one clock domain to another is known as a synchronizer. Without such synchronization, metastability problems produce invalid logic results, and this causes the digital system to fail. Metastability arises when the signal input to a flip flop in a particular clock domain does not meet the set-up or hold time requirements of that flip flop. In essence, in order for a flip flop in a first clock domain to function properly, its input signal must be stable for a certain period of time before the flip flop is clocked (set-up time), and remain stable for a certain period of time after the flip flop is clocked (hold time). A signal from a second clock domain, which is not synchronized with the clock of the first clock domain, may not necessarily meet these requirements. As a result, such an input signal can place the flip flop in a "metastable state" wherein its output is momentarily somewhere between logic 0 and logic 1. The flip flop will eventually settle to a proper logic level after a finite period of time termed "the resolution time." During the time the flip flop is in the metastable state, the flip flop produces unpredictable logic results that can cause system failure. Accordingly, a synchronizer circuit must confront and resolve the problem of metastability.

Figure 1:
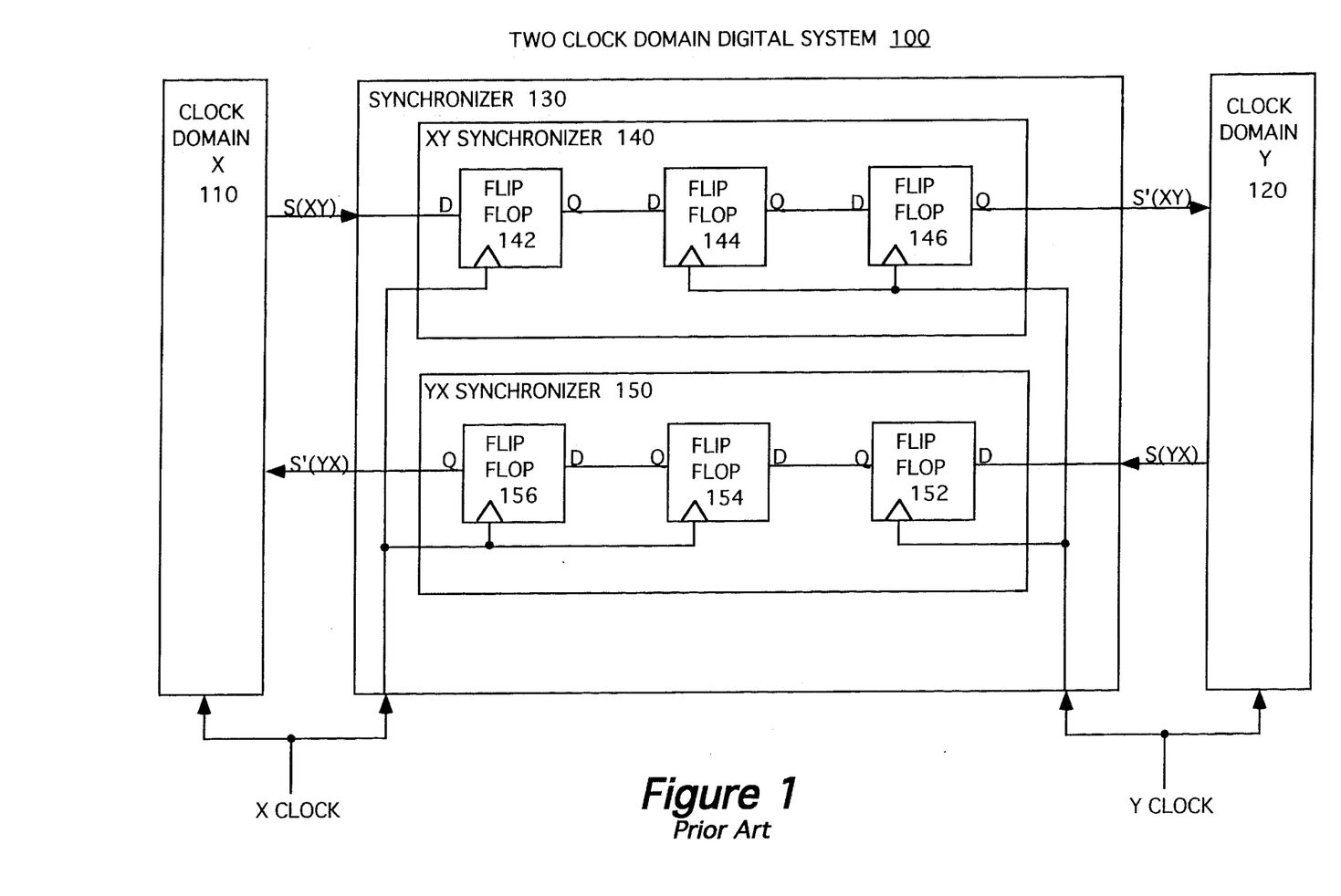
FIG. 1 illustrates a block diagram of a two clock domain digital system that uses a prior art synchronizer to synchronize signals traveling between the two clock domains.

Referring now to FIG. 1, a digital system 100 having two clock domains and a prior art synchronizer is illustrated in block diagram form. System 100 can be viewed as being comprised of three major blocks. The first two blocks, clock domain X 110 and clock domain Y 120, contain all the logic elements for each of the two clock domains, respectively. The third block, synchronizer block 130, contains all the logic elements that are used to synchronize signals passing between the two clock domains. The system also includes an X clock for providing clocking to clock domain X, and a Y clock for providing clocking to clock domain Y.

The synchronizer block is formed by two sub synchronizer blocks: XY synchronizer 140 and YX synchronizer 150. Signal S(XY) to be transmitted from clock domain X 110 to clock domain Y 120 is coupled from clock domain X 110 to XY synchronizer block 140. Block 140 synchronizes signal S(XY) from clock domain X 110 and provides synchronized signal S'(XY) to clock domain Y 140. Similarly, signal S(YX) to be transmitted from clock domain Y 120 to clock domain X 110 is coupled from clock domain Y 120 to YX synchronizer block 150. Block 150 synchronizes signal S(YX) from clock domain Y 120 and provides synchronized signal S'(YX) to clock domain X 110. As illustrated in FIG. 1, both the X clock and the Y clock provide clocking to synchronizer block 130 which utilizes this clocking to accomplish the synchronization of signals.

XY synchronizer 140 and YX synchronizer 150 are comprised of similar parts and operate similarly. Both synchronizers 140 and 150 are formed by an input flip flop, a settling flip flop and an output flip flop. The input flip flop is clocked by the clock of the domain from which the signal is being received. The settling and output flip flops are clocked by the clock of the domain to which the signal is being transmitted. Thus, for XY synchronizer 140, flip flop 142 is the input flip flop. Input flip flop 142 is clocked by the X clock and receives signal S(XY) as its input. Flip flops 144 and 146 are, respectively, the settling and output flip flops for XY synchronizer 140. Flip flops 144 and 146 are both clocked by the Y clock. Settling flip flop 144 receives the output from input flip flop 142 (clocked at the X clock) and allows the signal to settle for one Y clock period before passing the signal to output flip flop 146. Output flip flop 146 then holds the signal provided by settling flip flop 144 for one Y clock period before providing the synchronized output signal S(XY) to clock domain Y 120.

Without settling flip flop 144, data would usually transfer properly from clock domain X to clock domain Y. Occasionally, however, the X and Y domain clocks would have pulses that change so close together in time that the set-up or hold time requirements for output flip flop 146 would not be met. This would cause a metastable state and the signal output by output flip flop 146 may or may not have the correct value. Settling flip flop 144 introduces a one Y clock period delay that permits any metastability to be resolved. If one Y clock period is insufficient to permit the metastability to resolve to a desired level of confidence, then additional settling flip flops are inserted in the path between the two domains.

YX synchronizer 150 is symmetric with respect to XY synchronizer 140. Thus, in YX synchronizer 150, input flip flop 152 is clocked by the Y clock and receives signal S(YX) from clock domain Y 120. Settling and output flip flops 154 and 156, respectively, are both clocked by the X clock. Output flip flop 156 provides synchronized signal S'(YX) as output to clock domain X 110.

It will be appreciated that the prior art synchronizer illustrated in FIG. 1 suffers from significant shortcomings. In particular, settling flip flops 144 and 154 each introduce a one clock period delay. Speed and performance have taken on increased significance in recent digital designs, however. Modern computer systems demand the use of high frequency clocking, while also requiring minimal system failures, and little, if any, synchronizer delay. The trend toward high speed and high performance can be expected to continue, as faster and faster computer systems are designed and implemented. Accordingly, the insertion of a settling delay period whenever a signal crosses a clock domain border is increasingly less desirable.

SUMMARY OF THE INVENTION

A method and apparatus is disclosed for implementing a zero latency synchronizer that advantageously permits the reliable transfer of data between clock domains by placing a metastability delay in the clock path. Introducing a delay in the clock path permits clocking signals to be generated that guarantee that data will be transferred reliably through the data path. At the same time, the periodic nature of the clock signal permits the delay to be introduced without causing a degradation in the transfer of data through the data path. In this way, the prior art need to provide a metastability delay in the data path is eliminated. Therefore, the present invention permits data to be reliably transferred between clock domains faster than could be accomplished if there was a data path metastability delay without introducing a sacrifice in data transfer reliability. By placing the metastability delay in the clock path instead of the data path, data can be reliably transferred between clock domains without delay.

The zero latency synchronizer for synchronizing a signal from a first clock domain to a second clock domain is formed using a clock regenerator circuit and input and output master slave flip flops. The clock regenerator receives a first clock from the first clock domain and a second clock from the second clock domain and generates first and second regenerated clock signals. The first and second regenerated clock signals are formed in a manner that guarantees that the first and second regenerated clocks, in conjunction with the first and second clocks, can be used to control the input and output master slave flip flops and thereby pass data reliably from one clock domain to the other without delay.

The master and the slave of the input flip flop are controlled respectively by the first clock domain clock and by the first regenerated clock. In turn, the master and slave of the output flip flop are respectively controlled by the second regenerated clock and by the second clock domain clock. A signal to be transferred from the first clock domain to the second clock domain is input to the master of the input flip flop. The output from the slave of the input flip flop is provided as input to the master of the output flip flop. Accordingly, the output of the slave of the output flip flop is the signal from the first domain clock synchronized to the second domain clock.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

In the following description, for purposes of explanation, specific numbers, materials and configurations are set forth in order to provide a thorough understanding of the present invention. It will be apparent to one skilled in the art, however, that the present invention can be practiced without these specific details. In other instances, well known systems are shown in diagrammatic or block diagram form in order not to obscure the present invention unnecessarily.

Figure 2:
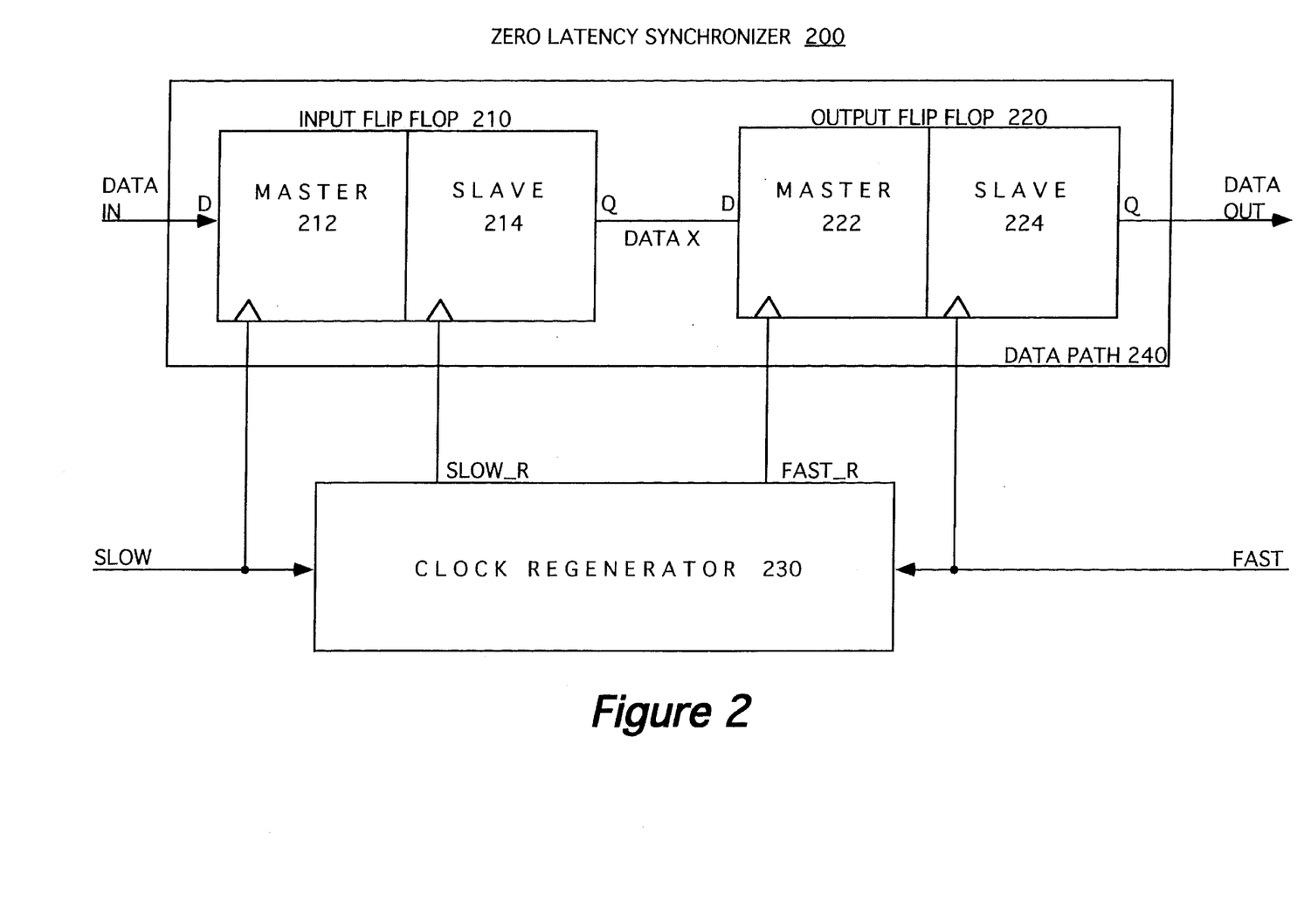
FIG. 2 illustrates a diagram of a zero latency synchronizer constructed according to the present invention.

FIG. 2 illustrates a diagram of a zero latency synchronizer constructed according to the present invention. Zero latency synchronizer 200 has applicability to any situation wherein data is transferred asynchronously from a first clock domain to a second clock domain. For example, it is quite common within a computer system to have a processor that operates at a clock speed that is different from the clock speed of the bus that the processor uses to communicate with the rest of the computer system.

Zero latency synchronizer 200 is formed by input master slave flip flop 210, output master slave flip flop 220 and clock regenerator 230. Input master slave flip flop 210 and output master slave flip flop 220 together form data path 240. Synchronizer 200 synchronizes signal DATA IN from a slow clock domain controlled by clock signal SLOW, to a relatively faster clock domain controlled by clock signal FAST, and provides synchronized signal DATA OUT to the faster clock domain.

Signal DATA IN is received from the slow clock domain by master 212 of input flip flop 210. Signal DATA X is received by master 222 of output flip flop 220 from slave 212 of input flip flop 210. Signal DATA OUT is provided to the fast clock domain by slave 224 of output flip flop 220. Master 212 and slave 214 of input flip flop 210 are controlled respectively by clock signals SLOW and SLOW_R. Master 222 and slave 224 of output flip flop 220 are controlled respectively by clock signals FAST and FAST_R. Clock regenerator 230 receives clock signals SLOW and FAST and generates clock signals SLOW_R and FAST_R. The regenerated clocks have minimal duty cycles for maximum compatibility with each other and with clock signals FAST and SLOW.

Clock signals SLOW and FAST are asynchronous to each other. Clock regenerator 230, however, generates clock signals SLOW_R and FAST_R from clock signals SLOW and FAST in a manner that guarantees that clock signals SLOW_R and FAST_R are synchronized. Furthermore, clock regenerator 230 generates clock signal SLOW_R from clock signal SLOW in a manner that guarantees that clock signals SLOW and SLOW_R are synchronized. Moreover, clock regenerator 230 generates clock signal FAST_R from clock signal FAST in a manner that guarantees that clock signals FAST and FAST_R are synchronized. Note that the term "synchronized" as used herein does not necessarily mean that synchronized clocks are identical with respect to frequency and pulse length. The term as used herein refers instead to a compatibility between the two signals.

Signal DATA IN is controlled by clock signal SLOW and is received by master 212 of input flip flop 210. Because master 212 is also controlled by clock signal SLOW, it is clear that master 212 will latch signal DATA IN without the introduction of metastability. Slave 214 is in turn controlled by clock signal SLOW_R and receives the output of master 212. Because master 212 is controlled by clock signal SLOW, and further because signal SLOW_R has been generated in a manner that guarantees that SLOW_R has its rising edge in a short (albeit variable) period after the rising edge of the clock SLOW and also that SLOW_R has its falling edge long before the falling edge of the clock SLOW, it is clear that slave 214 will latch the output signal from master 212 without the introduction of metastability.

Furthermore, master 222 of output flip flop 220 is controlled by clock signal FAST_R and receives output signal DATA X from slave 214. Because slave 214 is controlled by clock signal SLOW_R, and further because signals SLOW_R and FAST_R have been generated from the same source in a manner that guarantees that signal SLOW_R is mutually synchronized with signal FAST_R, it is clear that master 214 will latch signal DATA X output from slave 214 without the introduction of metastability.

Moreover, slave 224 is in turn controlled by clock signal FAST and receives the output of master 222. Because master 222 is controlled by clock signal FAST_R, and further because signal FAST_R has been generated in a manner that guarantees that the rising edge of FAST_R is synchronized to the rising edge of FAST except that FAST_R has a small phase advance to compensate for jitter between the two clocks and also guarantees that the falling edge of FAST_R occurs much later than the falling edge of FAST, it is clear that slave 224 will latch the output signal from master 222 without the introduction of metastability.

Finally, signal DATA OUT is controlled by clock signal FAST and is provided as output from slave 224 of output flip flop 220 to a clock domain that is also controlled by clock signal FAST. Therefore, it is clear that slave 224 will output signal DATA OUT without the introduction of metastability.

As will be explained below, clock regenerator 230 permits synchronization of the SLOW and FAST clock domains with zero latency by shifting the metastability settling delay from the data path to the clock path. Therefore, zero latency synchronizer 200 can reliably synchronize signal DATA IN from the slow clock domain to signal DATA OUT of the fast clock domain without introducing a metastability delay into the data path.

In any system having two different speed clock domains, the clock of one clock domain will be faster than the clock of the other. Although synchronizer 200 is illustrated as synchronizing a signal from a slow clock domain to a fast clock domain, the same technique can be applied to move data from the fast to the slow domain. In such a case, the clock regeneration is altered slightly to shift the phase margins between the domain and regenerated clocks the opposite way. The implementation details for such implementation will be readily apparent to one skilled in the art in view of the description provided herein.

Figure 3:
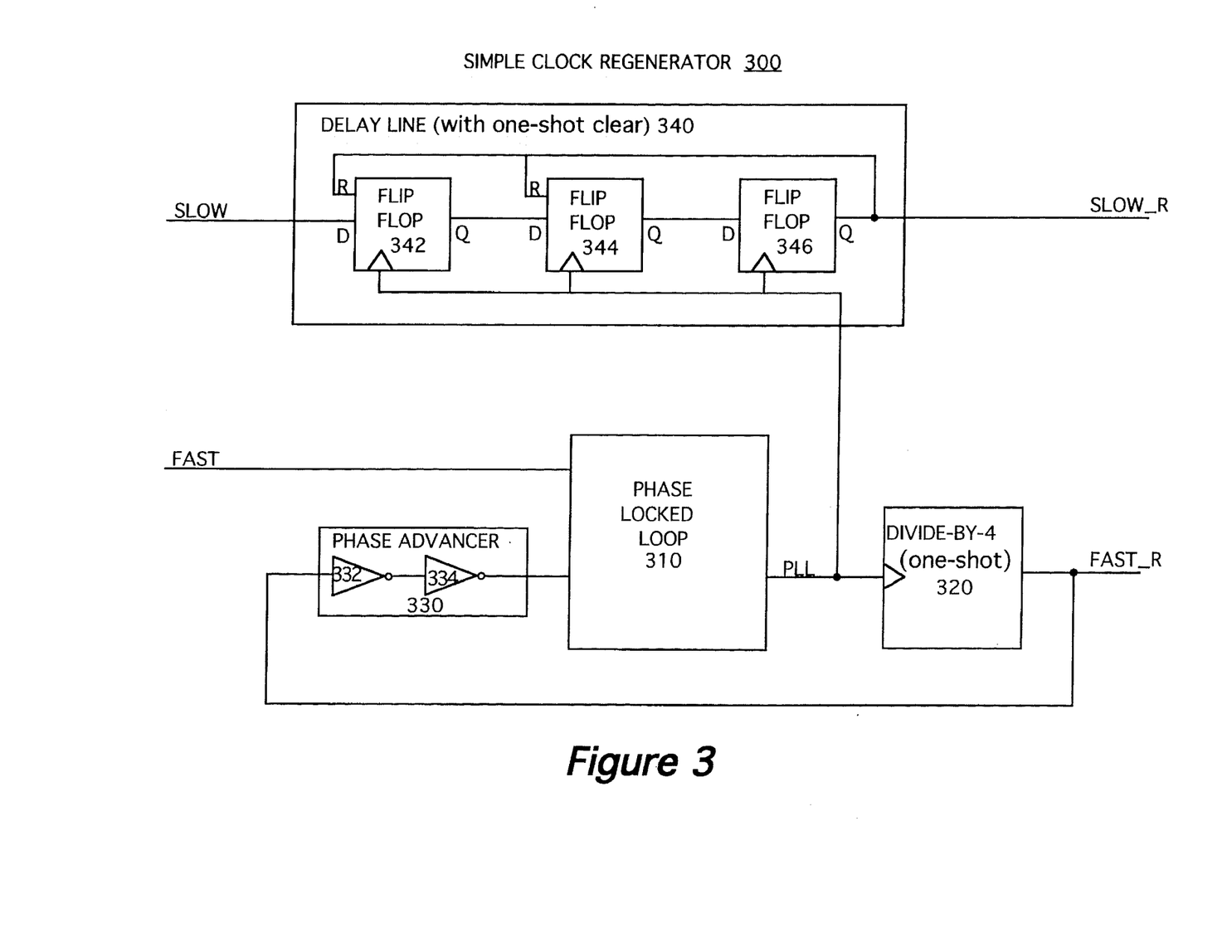
FIG. 3 illustrates a simple clock regenerator circuit constructed according to the present invention.

FIG. 3 illustrates a simple clock regenerator circuit 300 constructed according to the present invention. Clock regenerator 300 is formed by phase locked loop 310, divide-by-4 circuit 320, phase advancer 330 and delay line 340.

Clock signal FAST is provided as input to phase locked loop 310. The output of phase locked loop 310 is provided as input to divide-by-4 circuit 320 and also provided as a clocking signal to delay line 340. The output of divide-by-4 circuit 320 is regenerated clock signal FAST_R. Signal FAST_R is also fed back through phase advancer 330 to phase locked loop 310. Clock signal SLOW is provided as input to delay line 340, clocks through delay line 340 under control of the output signal from phase locked loop 310 and is output from delay line 340 as regenerated clock signal SLOW_R.

Phase locked loop 310 is designed to operate at a speed equal to four times the speed of clock signal FAST. Divide-by-4 circuit 320 is a one-shot clear circuit that operates off of the output signal from phase locked loop 310. The output of divide-by-4 circuit 320 is fed back through phase advancer 330 to be input into phase locked loop 310. Phase advancer 330 is formed by inverters 332 and 334 coupled in series. Phase advancer 330 inserts a slight phase advance to the signal output from divide-by-4 circuit 320. The purpose of the slight phase advance is to compensate for any jitter in clock signal FAST or introduced by phase locked loop 310. Thus, regenerated clock signal FAST_R output from divide-by-4 circuit 320 has approximately the same frequency as clock signal FAST. Furthermore, although clock signal FAST has a duty cycle of fifty percent, clock signal FAST_R has a duty signal of twenty-five percent. Moreover, clock signals FAST and FAST_R are synchronized so that a rising edge of signal FAST_R always precedes a rising edge of signal FAST and a falling edge of FAST_R will be much later than a falling edge of FAST. Therefore, it is clear from these constraints that output flip flop 220 will function without a problem.

Delay line 340 is formed by flip flops 342, 344 and 346 coupled in series. The SLOW clock is regenerated by passing it through delay line 340. The delay of delay line 340 is just greater than an integer multiple (e.g. 1, 2, 3, etc.) of a SLOW clock period. The length of the delay line may be programmed in hardware, in software or self-programmed.

The clock signal SLOW is input to flip flop 342 and clocks through flip flop 344 and then flip flop 346 under the control of the output signal from phase locked loop 310. The output of flip flop 346 is regenerated clock signal SLOW_R. Signal SLOW_R is also fed back to the resets of flip flops 342 and 244 thereby providing a one-shot clear mechanism for delay line 340. To create a reduced duty cycle on SLOW_R, the delay line clears to '0' after passing a '1' out. Thus, when signal SLOW_R transitions from low to high, flip flops 342 and 344 will be reset (cleared). Then, on the next phase locked loop clock, regenerated clock signal SLOW_R will transition from high to low. This ensures good compatibility between clocks SLOW and SLOW_R provided that the period of phase locked loop 310 is less than half of one phase of clock SLOW. So long as clock FAST is indeed faster than clock SLOW, and divide-by-4 320 operates on the output of phase locked loop 310 to form clock FAST_R, then it will be guaranteed that the period of phase locked loop 310 is less than half of one phase of clock SLOW.

Delay line 340 inserts a metastability delay into the clock path. Thus, any metastability between the slow and fast clock domains will occur at the start of delay line 340 and will have the whole length of delay line 340 to settle out (i.e. 1, 2 or 3 cycles of a slow clock period). The length of the metastability delay is governed by the number of flip flops in delay line 340. Thus, if a metastability delay period longer than three phase locked loop 310 clock periods is required, additional flip flops are added to delay line 340. On the other hand, if a metastability delay period shorter than three phase locked loop 310 clock periods will suffice, one or two flip flops can be removed from delay line 340.

Because the metastability delay occurs in the clock path rather than the data path, the transfer of data between the two clock domains can occur reliably without the need to introduce a delay into the data path. Thus, SLOW_R has its rising edge a short (albeit variable) period after the rising edge of clock SLOW. Furthermore, because of the short pulse width of SLOW_R, the falling edge of SLOW_R occurs long before the falling edge of the clock SLOW. Therefore it is clear that the input flip flop will work without problem. Moreover, because SLOW_R and FAST_R are created from the same source (i.e. phase locked loop 310), the intermediate data transfer from the input flip flop to the output flip flop will work without problem.

Figure 4:
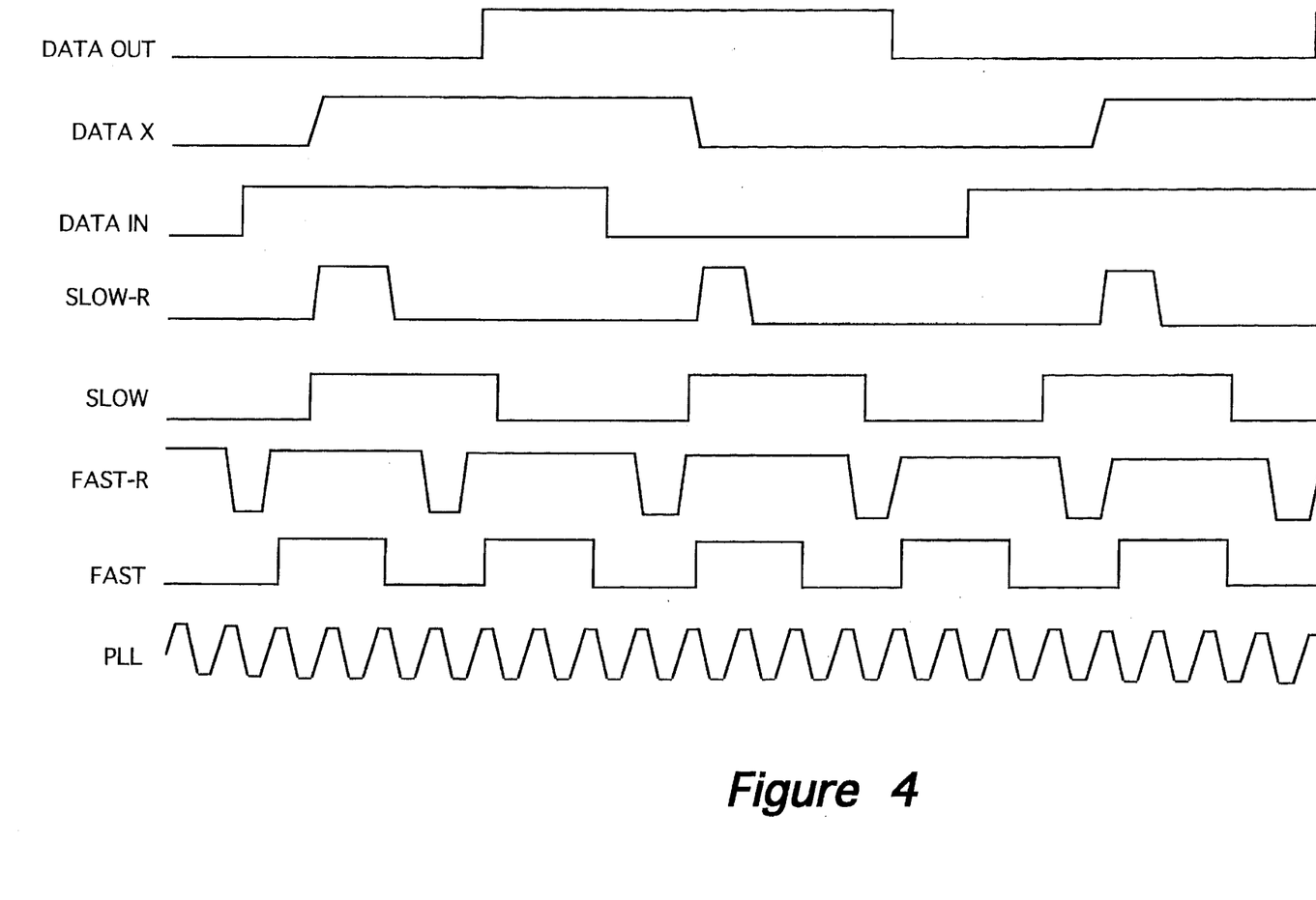
FIG. 4 illustrates a timing diagram of the transfer of data from a slow clock domain to a fast clock domain with zero latency introduced into the data path.

FIG. 4 illustrates a timing diagram of the transfer of data from a slow clock domain to a fast clock domain with zero latency introduced into the data path. In FIG. 4 it can be seen that the frequency of clock signal FAST is greater than that of clock signal SLOW. Furthermore, the frequency of the clock signal PLL, output from the phase locked loop, is four times that of clock signal FAST.

Moreover, it can be seen in FIG. 4 that clock signals FAST and FAST_R are synchronized so that a rising edge of signal FAST_R always precedes a rising edge of signal FAST and a falling edge of FAST_R is much later than a falling edge of FAST. It can also be seen that SLOW_R has its rising edge a short (albeit variable) period after the rising edge of clock SLOW. Furthermore, because of the short pulse width of SLOW_R, the falling edge of SLOW_R occurs long before the falling edge of the clock SLOW.

Therefore, in FIG. 4, a change in the value of input signal DATA IN is followed by a corresponding change in intermediate signal DATA X on the next rising edge of clock signal SLOW_R. In turn, a change in the value of intermediate signal DATA X is followed by a corresponding change in output signal DATA OUT on the next rising edge of clock signal FAST_R. Thus it can be seen from the timing diagram that data passes from the slow clock domain to the fast clock domain with a high reliability and with zero latency in the data path.

Figure 5:
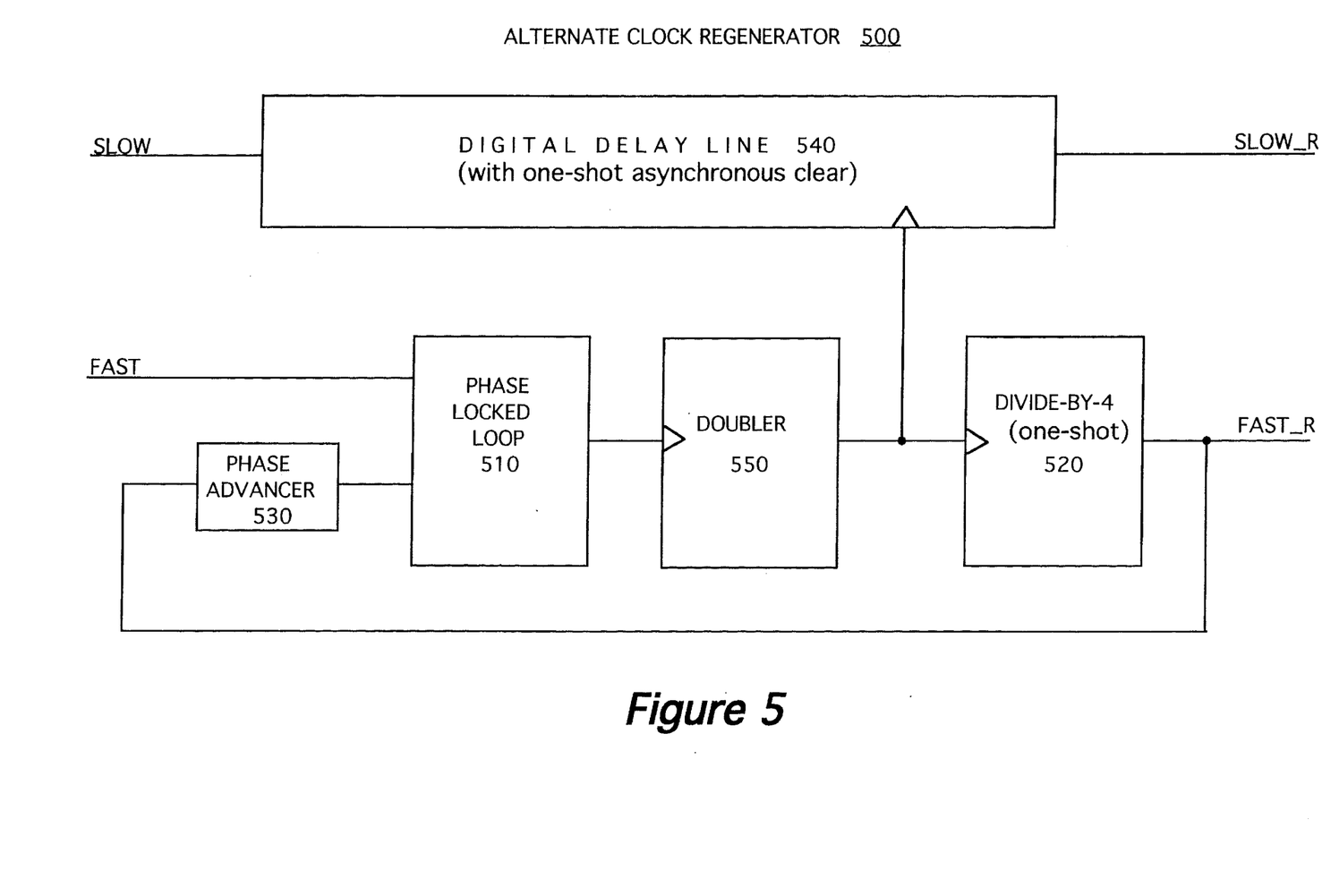
FIG. 5 illustrates an alternate clock regenerator circuit.

FIG. 5 illustrates an alternate clock regenerator circuit that has a wide operating range. Clock regenerator 500 is formed by phase locked loop 510, doubler 550, divide-by-4 circuit 520, phase advancer 530 and delay line 540.

Clock signal FAST is provided as input to phase locked loop 510. The output of phase locked loop 510 is provided as input to doubler 550. The output of doubler 550, in turn, is provided as input to divide-by-4 circuit 520 and also provided as a clocking signal to delay line 540. The output of divide-by-4 circuit 520 is regenerated clock signal FAST_R. Signal FAST_R is also fed back through phase advancer 530 to phase locked loop 510. Clock signal SLOW is provided as input to delay line 540, clocks through delay line 540 under control of the frequency doubled output signal from phase locked loop 510 and is output from delay line 540 as regenerated clock signal SLOW_R.

Phase locked loop 510 operates at a speed equal to twice the speed of clock signal FAST. Because many digital subsystems frequently have a phase locked loop circuit already designed that operates at twice the frequency of the subsystem, it may be the case that phase locked loop 510 can be implemented using a circuit that has already been designed without the need to introduce new frequency limits as may be the case for a phase locked loop that operates at four times the frequency of the subsystem. The output of phase locked loop 510 is then doubled in frequency by doubler 550 to a speed equal to four times the speed of clock signal FAST. Divide-by-4 circuit 520 is a one-shot clear circuit that operates off of the output signal from doubler 550. The output of divide-by-4 circuit 520 is fed back through phase advancer 530 to be input into phase locked loop 510. Phase advancer 530 inserts a slight phase advance to the signal output from divide-by-4 circuit 520. The purpose of the slight phase advance is to compensate for any jitter in clock signal FAST or introduced by phase locked loop 510. Thus, regenerated clock signal FAST_R output from divide-by-4 circuit 520 has approximately the same frequency as clock signal FAST. Furthermore, although clock signal FAST has a duty cycle of fifty percent, clock signal FAST_R has a duty signal of twenty-five percent. Moreover, clock signals FAST and FAST_R are synchronized so that a rising edge of signal FAST_R always precedes a rising edge of signal FAST and a falling edge of FAST_R will be much later than a falling edge of FAST. Therefore, it is clear from these constraints that the output flip flop 220 will function without a problem.

Delay line 540 is a one-shot delay line with an asynchronous clear. The SLOW clock is regenerated by passing it through delay line 540. The delay of delay line 540 is just greater than an integer multiple (e.g. 1, 2, 3, etc.) of a SLOW clock period. The length of the delay line may be programmed in hardware, in software or self-programmed.

The clock signal SLOW is input to delay line 540 and clocks through delay line 540 under the control of the frequency doubled output signal from phase locked loop 510. The output of delay line 540 is regenerated clock signal SLOW_R. Delay line 540 has an asynchronous one-shot clear mechanism to create a reduced duty cycle on SLOW_R, the delay line asynchronously clears to '0' after passing a '1' out. Thus, when signal SLOW_R transitions from low to high, regenerated clock signal SLOW_R will asynchronously transition from high to low before the next phase locked loop clock. By making the output of delay line 540 be a short pulse controlled by a separate monostable circuit, a wider operating range is permitted than is the case where the reset is tied to the output of phase locked loop 510. The asynchronous reset ensures good compatibility between clocks SLOW and SLOW_R while removing the limitation that the period of phase locked loop 510 be less than half of one phase of clock SLOW. In fact, by providing an asynchronous clear for delay line 540, clock regenerator 500 will function properly even when the frequency of the clock herein referred to as SLOW is slightly greater than the frequency of the clock herein referred to as FAST.

Delay line 540 inserts a metastability settling delay into the clock path. Thus, any metastability between the slow and fast clock domains will occur at the start of delay line 540 and will have the whole length of delay line 540 to settle out (i.e. 1, 2 or 3 cycles of a slow clock period). Thus, SLOW_R has its rising edge a short (albeit variable) period after the rising edge of clock SLOW. Furthermore, because of the short pulse width of SLOW_R, the falling edge of SLOW_R occurs long before the falling edge of the clock SLOW. Therefore it is clear that the input flip flop will work without problem. Moreover, because SLOW_R and FAST_R are created from the same source (i.e. phase locked loop 510), the intermediate data transfer from the input flip flop to the output flip flop 220 will work without problem.

Figure 6:
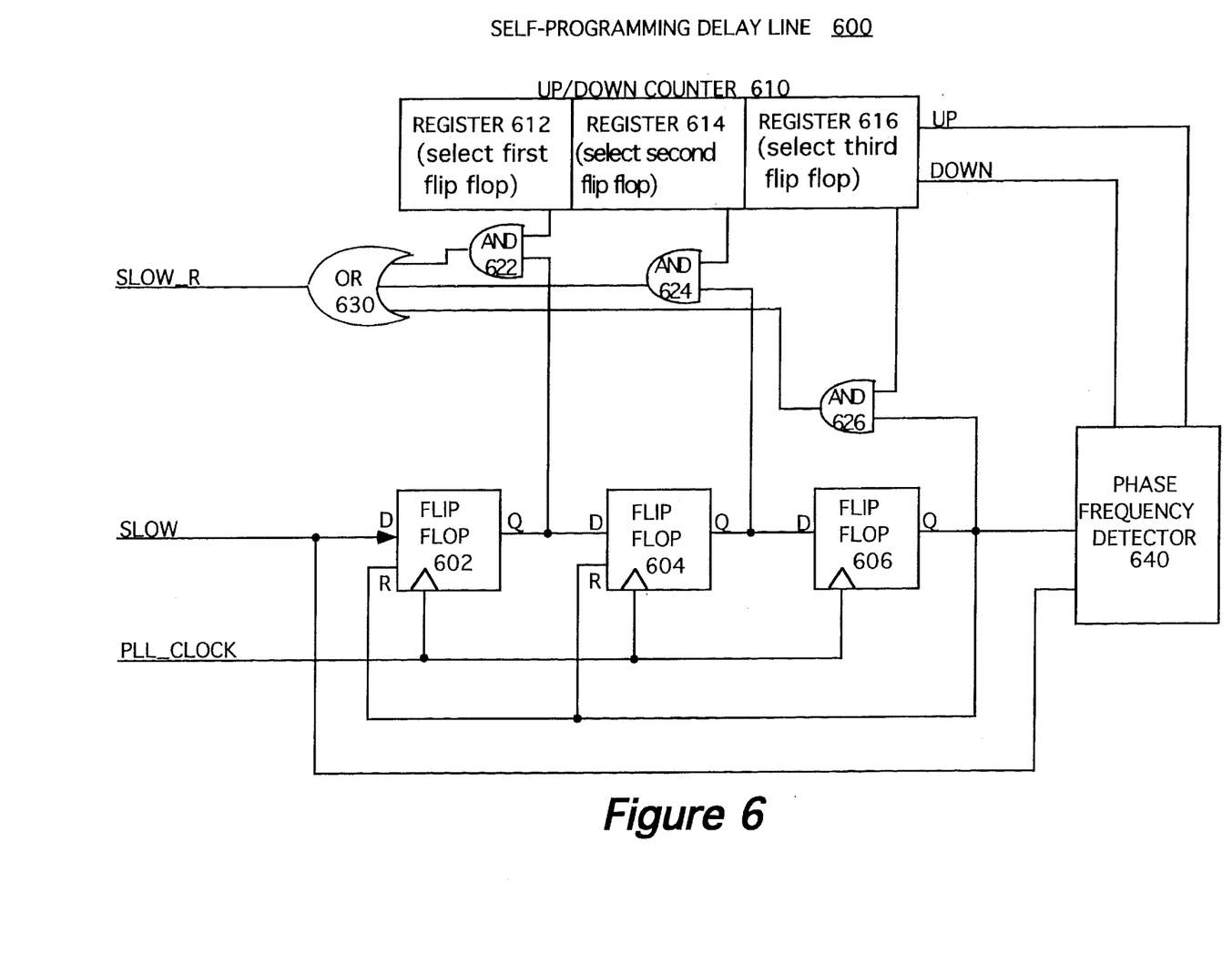
FIG. 6 illustrates a self-programming digital delay line suitable for use in a synchronizer wherein the relative speeds of the clock domains is not known a priori.

FIG. 6 illustrates a self-programming digital delay line suitable for use in a synchronizer wherein the relative speeds of the clock domains is not known a priori. Self-programming delay line 600 is formed by flip flops 602, 604 and 606, phase frequency detector 640, up/down counter 610, OR gate 630 and by AND gates 622, 624 and 626.

Clock signal SLOW is provided as input to a delay line formed by coupling flip flops 602, 604 and 606 in series. The phase locked loop generated clock signal PLL_CLOCK controls flip flops 602, 604 and 606, and hence the propagation of clock signal SLOW through the delay line. The output from flip flop 606, i.e. the final flip flop in the delay line, is fed back to reset flip flops 602 and 604, thereby providing a one-shot synchronous reset mechanism for self-programming delay line 600.

The clock signal SLOW and the output of flip flop 606 are provided as input to phase frequency detector 640. Phase frequency detector compares its two inputs and, depending upon their relative values, provides signal UP or DOWN to up/down counter 610. Up/down counter 610 is formed by registers 612, 614 and 616 which correspond to flip flops 602, 604 and 606, respectively. The output of flip flop 602 and the output of its corresponding register 612 of up/down counter 610 are coupled together by AND gate 622. Furthermore, the output of flip flop 604 and the output of its corresponding register 614 of up/down counter 610 are coupled together by AND gate 624. Moreover, the output of flip flop 606 and the output of its corresponding register 616 of up/down counter 610 are coupled together by AND gate 626. The outputs from AND gates 622, 624 and 626 are each provided as input to OR gate 630. The output of OR gate 630, in turn, is the regenerated clock signal SLOW_R.

Thus, the flip flop of the delay line that provides signal SLOW_R as output, and hence the length of the delay line, is determined by the particular register of up/down counter 610 that has been set. The particular register of up/down counter 610 that has been set, in turn, is determined by a comparison made by phase frequency detector 640 of clock signal SLOW and the output of the final flip flop of the delay line (which is controlled by signal PLL_CLOCK that was generated from clock signal FAST). Therefore, self-programming delay line 600 will automatically adjust the metastability settling delay that it provides to regenerated clock signal SLOW_R based upon the relative frequencies of clock signals SLOW and FAST to provide the proper delay.

The synchronizer circuit presented herein can be applied, for example, to synchronize a processor to a bus. Thus, in the case where a processor, operating at a clock speed greater than that of a bus, was coupled to the bus by synchronizer 200, clock FAST would be the clock of the processor and clock SLOW would be the clock of the bus. Data from the processor then would be that of signal DATA IN and data to the bus would be that of signal DATA OUT. Alternately, in the case where a processor, operating at a clock speed slower than that of a bus, was coupled to the bus by synchronizer 200, clock FAST would be the clock of the bus and clock SLOW would be the clock of the processor. Data from the bus then would be that of signal DATA IN and data to the processor would be that of signal DATA OUT.

While the method and apparatus of the present invention has been described in terms of its presently preferred and alternate embodiments, those skilled in the art will recognize that the present invention may be practiced with modification and alternation within the spirit and scope of the appended claims. The specification and drawings are, accordingly, to be regarded in an illustrative rather than a restrictive sense.

What is claimed is:

1. An apparatus for coupling a first circuit operating at a first clock rate and a second circuit operating at a second clock rate, comprising:

a data path circuit coupling the first and the second circuit and transferring data from the first circuit to the second circuit in response to a regenerated clock signal, wherein the data path circuit includes:

an input flip flop having an input master and an input slave, the input master receiving an input signal from the first circuit, the input signal being under control of a first clock operating at the first clock rate, and an output flip flop having an output master and an output slave, the output slave providing an output signal to the second circuit, the output signal being under control of a second clock operating at the second clock rate, the input slave providing an intermediate signal as input to the output master; and a clock regenerator circuit, coupled to the data path circuit, generating the regenerated clock signal from a first clock signal operating at the first clock rate and a second clock signal operating at the second clock rate, wherein the clock regenerator circuit is coupled to said input and output flip flops and generates a first regenerated clock to control the input slave and a second regenerated clock to control the output master, the first and second regenerated clocks being generated from a common source, the first regenerated clock having a rising edge synchronized with, and advanced from, the first clock, the first regenerated clock having a short pulse with a falling edge that follows the rising edge of the first clock but that precedes the falling edge of the first clock, the second regenerated clock having a rising edge synchronized with, and advanced from, the second clock, the second regenerated clock having a falling edge that follows the falling edge of the second clock.

2. The apparatus of claim 1, further wherein the clock regenerator circuit is for introducing a metastability delay in the regenerated clock signal.

3. The apparatus of claim 1, wherein the first clock rate is greater than the second clock rate.

4. The apparatus of claim 1, wherein the first clock rate is less than the second clock rate.

5. The apparatus of claim 1, wherein the first circuit comprises a processor and the second circuit comprises a bus.

6. The apparatus of claim 1, wherein the first circuit comprises a bus and the second circuit comprises a processor.

7. The apparatus of claim 1, wherein the clock regenerator circuit comprises:

a phase locked loop operating at speed N wherein N is an integral multiple of a fast clock signal, the fast clock signal being the faster of the first and second clocks, the phase locked loop having as first input the fast clock signal and having as output a PLL signal;

a one-shot divide-by-N circuit having as input the PLL signal and having as output a fast regenerated clock signal corresponding to the fast clock;

a phase advancer having as input the fast regenerated clock signal, the phase advancer providing the fast regenerated clock signal with a phase advance as a second input to the phase locked loop; and a one-shot clear delay line controlled by the PLL signal, the delay line having as input a slow clock signal, the slow clock signal being the slower of the first and second clocks, and having as output a slow regenerated clock signal corresponding to the slow clock, the delay line imposing a delay of an integral multiple of a period of the slow clock.

8. The apparatus of claim 7, wherein the one-shot clear of the delay line is synchronous to the PLL signal.

9. The apparatus of claim 7, wherein the one-shot clear of the delay line is asynchronous to the PLL signal.

10. The apparatus of claim 7, wherein the delay line is self-programming and sets a delay based upon the slow clock.

11. The synchronizer as set forth in claim 7, wherein N is four times the speed of the fast clock signal.

12. The apparatus of claim 8, wherein the clock regenerator circuit comprises:

a phase locked loop operating at speed N wherein N is an integral multiple of a fast clock signal, the fast clock signal being the faster of the first and second clocks, the phase locked loop having as first input the fast clock signal and having as output a PLL signal;

a multiplier operating at speed M wherein M is an integral multiple of N, the multiplier having as input the PLL signal and having as output a multiplied PLL signal;

a one-shot divide-by-M circuit having as input the multiplied PLL signal and having as output a fast regenerated clock signal corresponding to the fast clock;

a phase advancer having as input the fast regenerated clock signal, the phase advancer providing the fast regenerated clock signal with a phase advance as a second input to the phase locked loop; and a one-shot clear delay line controlled by the multiplied PLL signal, the delay line having as input a slow clock signal, the slow clock signal being the slower of the first and second clocks, and having as output a slow regenerated clock signal corresponding to the slow clock, the delay line imposing a delay of an integral multiple of a period of the slow clock.

13. The apparatus of claim 12, wherein the one-shot clear of the delay line is synchronous to the multiplied PLL signal.

14. The apparatus of claim 12, wherein the one-shot clear of the delay line is asynchronous to the multiplied PLL signal.

15. The apparatus of claim 12, wherein the delay line is self-programming and sets a delay based upon the slow clock.

16. The apparatus of claim 12, wherein N is two times the speed of the fast clock signal and M is four times the speed of the fast clock signal.

17. A method for coupling a first circuit operating at a first clock rate and a second circuit operating at a second clock rate, the method comprising the steps of:

providing a data path circuit for transferring data from the first circuit to the second circuit in response to a regenerated clock signal, wherein the step of providing the data path circuit includes the steps of:

providing an input flip flop having an input master and an input slave, the input master receiving an input signal from the first circuit, the input signal being under control of a first clock operating at the first clock rate, and providing an output flip flop having an output master and an output slave, the output slave providing an output signal to the second circuit, the output signal being under control of a second clock operating at the second clock rate, the input slave providing an intermediate signal as input to the output master; and generating the regenerated clock signal for the data path circuit from a first clock signal operating at the first clock rate and a second clock signal operating at the second clock rate, wherein the step of generating the regenerated clock signal includes the steps of coupling said input and output flip flops and generating a first regenerated clock to control the input slave and a second regenerated clock to control the output master, the first and second regenerated clocks being generated from a common source, the first regenerated clock having a rising edge synchronized with, and advanced from, the first clock, the first regenerated clock having a short pulse with a falling edge that follows the rising edge of the first clock but that precedes the falling edge of the first clock, the second regenerated clock having a rising edge synchronized with, and advanced from, the second clock, the second regenerated clock having a falling edge that follows the falling edge of the second clock.

18. A computer system having a first circuit operating at a first clock rate and a second circuit operating at a second clock rate, the system comprising an apparatus for coupling the first circuit and the second circuit, the apparatus for coupling comprising:

a data path circuit coupling the first and the second circuit and transferring data from the first circuit to the second circuit in response to a regenerated clock signal, wherein the data path circuit includes:

an input flip flop having an input master and an input slave, the input master receiving an input signal from the first circuit, the input signal being under control of a first clock operating at the first clock rate, and an output flip flop having an output master and an output slave, the output slave providing an output signal to the second circuit, the output signal being under control of a second clock operating at the second clock rate, the input slave providing an intermediate signal as input to the output master; and a clock regenerator circuit, coupled to the data path, generating the regenerated clock signal from a first clock signal operating at the first clock rate and a second clock signal operating at the second clock rate, wherein the clock regenerator circuit is coupled to said input and output flip flops and generates a first regenerated clock to control the input slave and a second regenerated clock to control the output master, the first and second regenerated clocks being generated from a common source, the first regenerated clock having a rising edge synchronized with, and advanced from, the first clock, the first regenerated clock having a short pulse with a falling edge that follows the rising edge of the first clock but that precedes the falling edge of the first clock, the second regenerated clock having a rising edge synchronized with, and advanced from, the second clock, the second regenerated clock having a falling edge that follows the falling edge of the second clock.

* * * * *